(12) United States Patent
Zhang et al.

(10) Patent No.: US 9,665,716 B2
(45) Date of Patent: May 30, 2017

(54) DISCOVERY OF MALICIOUS STRINGS

(71) Applicant: McAfee, Inc., Santa Clara, CA (US)

(72) Inventors: Zheng Zhang, Portland, OR (US); Craig D. Schmugar, Hillsboro, OR (US)

(73) Assignee: McAfee, Inc., Santa Clara, CA (US)

(*) Notice: Subject to any disclaimer, the term of this patent is extended or adjusted under 35 U.S.C. 154(b) by 16 days.

(21) Appl. No.: 14/581,104

(22) Filed: Dec. 23, 2014

(65) Prior Publication Data

US 2016/0180088 A1    Jun. 23, 2016

(51) Int. Cl.
*G06F 12/16* (2006.01)
*G06F 12/14* (2006.01)
*G06F 11/00* (2006.01)
*G06F 21/56* (2013.01)
*H04L 29/06* (2006.01)

(52) U.S. Cl.
CPC .......... *G06F 21/564* (2013.01); *G06F 21/567* (2013.01); *H04L 63/14* (2013.01)

(58) Field of Classification Search
CPC . G06F 21/564; G06F 21/567; G06F 2221/034
USPC ........................................................ 726/23
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 2003/0023873 A1* | 1/2003 | Ben-Itzhak | G06F 21/51 726/26 |
| 2005/0240999 A1* | 10/2005 | Rubin | G06F 21/563 726/22 |
| 2006/0095521 A1* | 5/2006 | Patinkin | G06Q 10/107 709/206 |
| 2006/0098652 A1* | 5/2006 | Singh | H04L 45/00 370/389 |
| 2007/0240217 A1* | 10/2007 | Tuvell | G06F 21/56 726/24 |
| 2012/0159625 A1* | 6/2012 | Jeong | G06F 21/562 726/23 |
| 2013/0046763 A1* | 2/2013 | Sinclair | H04L 63/1416 707/737 |
| 2014/0082729 A1* | 3/2014 | Shim | G06F 21/51 726/23 |
| 2014/0115652 A1* | 4/2014 | Kapoor | G06F 21/554 726/1 |

OTHER PUBLICATIONS

Theresa C. Maxino; The Effectiveness of Checksums for Embedded Control Networks ; IEEE; vol. 6, No. 1, Jan.-Mar. 2009.*

* cited by examiner

*Primary Examiner* — Monjour Rahim
(74) *Attorney, Agent, or Firm* — Patent Capital Group (57) ABSTRACT

Particular embodiments described herein provide for an electronic device that can be configured to determine a string sample of data, determine a hash of the string sample of data, automatically cluster the hash with other hashes from other string samples of data, and automatically create a signature hash string for the string sample of data.

19 Claims, 8 Drawing Sheets

DISCOVERY OF MALICIOUS STRINGS

TECHNICAL FIELD

This disclosure relates in general to the field of information security, and more particularly, to the discovery of malicious strings.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
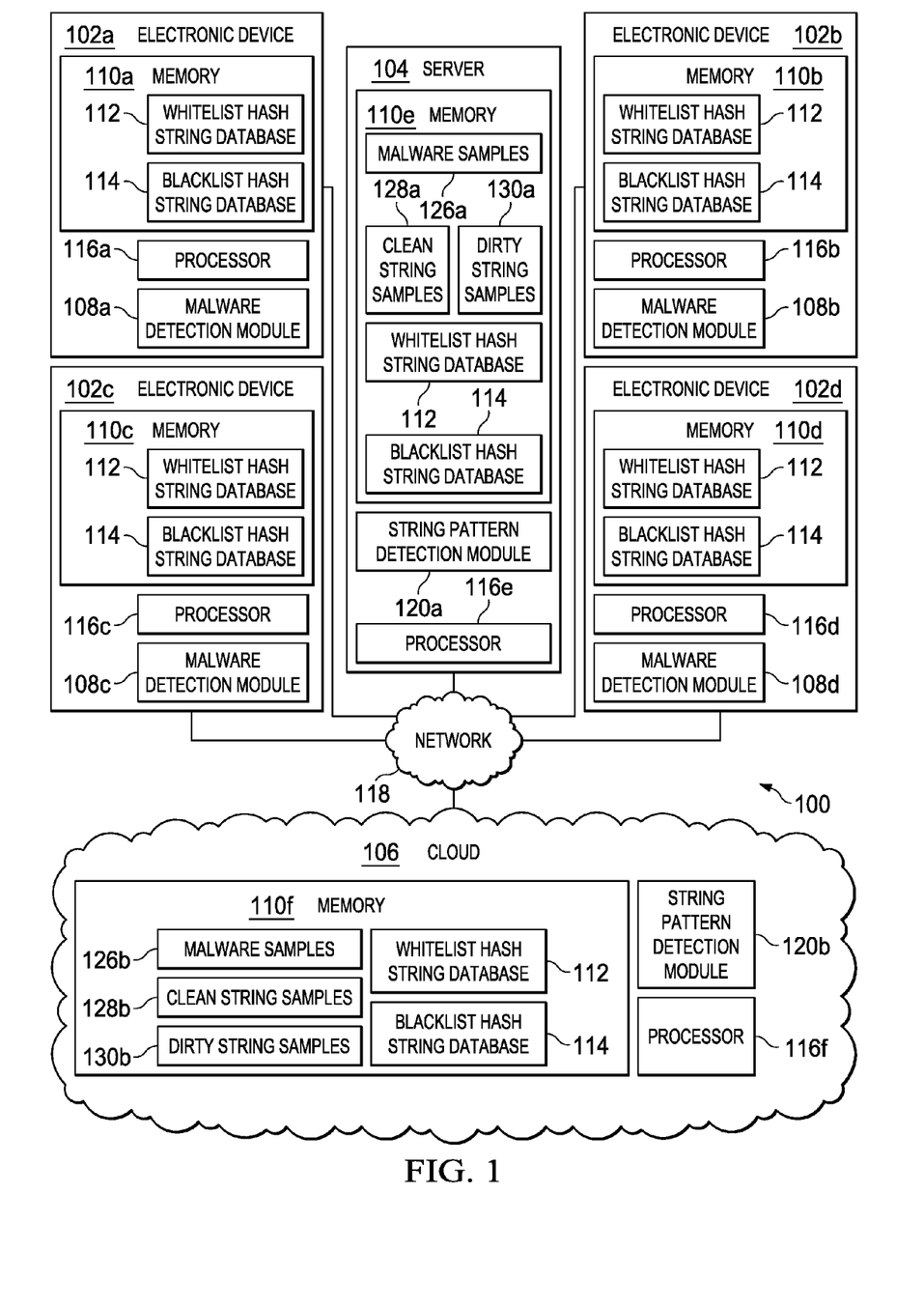
FIG. 1 is a simplified block diagram of a communication system for the discovery of malicious strings in accordance with an embodiment of the present disclosure.

FIG. 1 is a simplified block diagram of a communication system 100 for reputation determination through network characteristics in accordance with an embodiment of the present disclosure. As illustrated in FIG. 1, an embodiment of communication system 100 can include electronic devices 102a-102d, a server 104, and a cloud 106. Each electronic device 102a-102d can include a malware detection module 108a-108d respectively, memory 110a-110d respectively, and a processor 116a-116d respectively. Each memory 110a-110d can include a whitelist hash string database 112 and a blacklist hash string database 114. Server 104 can include memory 110e, a string pattern detection module 120a, and a processor 116e. Memory 110e can include whitelist hash string database 112, blacklist hash string database 114, malware samples 126a, clean string samples 128a, and dirty string samples 130a. Cloud 106 can include memory 110e, a string pattern detection module 120a, and a processor 116f. Memory 110l can include whitelist hash string database 112, blacklist hash string database 114, malware samples 126b, clean string samples 128b, and dirty string samples 130b. Electronic devices 102a-102d, server 104, and cloud 106 may be in communication using network 118.

In example embodiments, communication system 100 can be configured to automatically discover unique string patterns from large collections of malware samples. The collection of malware samples can be communicated from malware detection modules 108a-108d to server 104 or cloud 106 and stored in malware samples 126a and 126b. String pattern detection modules 120a and 120b can create hash of malicious strings. The created hashes of malicious strings can be communicated to electronic devices 102a-102d for use by malware detection modules 108a-d for the detection of malware.

Elements of FIG. 1 may be coupled to one another through one or more interfaces employing any suitable connections (wired or wireless), which provide viable pathways for network (e.g., network 118.) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

Text strings have been used for decades by the software security industry to detect malware. Strings are proven very effective in memory scanning to detect malware families. Currently, some processes of identifying malicious strings involve manually analyzing files or memory dumps to find strings that can uniquely identify the malware. Unfortunately, with the explosive growth of sample volumes and the prevalence of code polymorphism and encryption, it has become increasingly difficult to find and extract unique strings from malware samples and to create high quality samples. What is needed is an automated solution to discover common, but identifiable strings of malware from memory images and to use these strings to detect and fingerprint malware families, either locally or through a network element such a server or cloud.

A communication system for the discovery of malicious strings, as outlined in FIG. 1 can resolve these issues (and others). Communication system 100 may be configured to be fully automated and scaled to a large sample set, whereas some existing solutions require manual processes of sample analysis and signature authoring that cannot scale and do not use the strings to detect and fingerprint malware families. Communication system 100 can be configured to match strings through hashes, instead of literal string matching. Using hash-based matching can reduce the size of signatures, because hashes are generally much shorter than the literal strings they represent. Also, hash-based matching can reduce the risk of false positives due to unintended substring matches. The hash sizes can be compact and fixed to allow efficient server or cloud lookup and for the detection of dirty string patterns through a server or cloud.

Communication system 100 can include a backend (e.g., string pattern detection module 120a and 120b in server 104 and cloud 106 respectively) and a frontend (e.g., malware detection module 108a-108d in electronic devices 102a-102d respectively). The backend system can be configured to discover and build databases of both clean and dirty strings using string pattern detection module 120a and 120b. The frontend can be configured to scan and detect dirty strings using malware detection module 108a-108d and blacklist hash string database 114. In one example, the frontend can be configured to scan and detect dirty strings using a remote server or cloud lookup where the string signatures are located on a server or cloud (e.g., server 104 or cloud 106).

At the backend, the system can be configured to build dirty and clean string databases. In an illustrative example, strings extracted from clean samples (e.g., clean string samples 128a and 128b) are populated into a clean string database. The strings in the clean string database can be used to create hashes and populate a whitelist hash string database (e.g., whitelist hash string database 112). The strings extracted from dirty samples are first filtered with the strings in the whitelist hash string database. In an embodiment, for the strings not in the whitelist hash string database, the system can search online by using popular search engines (e.g., Google®, Bing®, Baidu®, etc.) to exclude the strings with high search hit counts. The remaining strings can be clustered and used to populate a dirty string database (e.g., dirty string samples 130a and 130b). For the top clusters from prevalent malware families, the system can automatically generate signatures of the dirty string hashes and create a blacklist hash string database (e.g., blacklist has string database 114). The blacklist hash string database can be communicated to the frontend.

At the frontend, the system can be configured to detect dirty string patterns during a memory scan. To limit the number of strings to process, the system first filters the strings extracted from memory images based on the string lengths and long strings can be selected and then be converted to hashes. The hashes can be matched against a local signature database for common clean strings (e.g., whitelist hash string database 112). Any matched hashes will not be scanned further. The system can then search for the signatures of known dirty strings using the blacklist hash string database (e.g., blacklist hash string database 114). Any match will result in dirty detections or a detection of malware. In one example, the system can query the backend dirty hash string database (e.g., dirty string samples 130b) through the server or cloud. Any positive response will result in dirty detection or a detection of malware.

Turning to the infrastructure of FIG. 1, communication system 100 in accordance with an example embodiment is shown. Generally, communication system 100 can be implemented in any type or topology of networks. Network 118 represents a series of points or nodes of interconnected communication paths for receiving and transmitting packets of information that propagate through communication system 100. Network 118 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic devices 102a-d, server 104, and cloud 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of electronic devices 102a-102d, server 104, and cloud 106 can include memory elements (e.g., memory 110a-110f) for storing information to be used in the operations outlined herein. Each of electronic devices 102a-102d, server 104, and cloud 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic devices 102a-102d, server 104, and cloud 106 may include software modules (e.g., malware detection modules 108a-108d and string pattern detection modules 126a and 126b) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic devices 102a-102d, server 104, and cloud 106 may include a processor (e.g., processor 116a-116f) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic devices 102a-102d can each be a network element and include, for example, desktop computers, laptop computers, mobile devices, personal digital assistants, smartphones, tablets, or other similar devices. Server 104 can be a network element such as a server or virtual server and can be associated with clients, customers, endpoints, or end users wishing to initiate a communication in communication system 100 via some network (e.g., network 118). The term 'server' is inclusive of devices used to serve the requests of clients and/or perform some computational task on behalf of clients within communication system 100. Although string pattern detection modules 120a and 120b are represented in FIG. 1 as being located in server 104 or cloud 108, this is for illustrative purposes only. String pattern detection modules 120a and 120b could be combined or separated in any suitable configuration. Furthermore, string pattern detection modules 120a and 120b could be integrated with or distributed in another network accessible by server 104 or cloud 106. Cloud 106 is configured to provide cloud services to electronic devices 102a-d. Cloud services may generally be defined as the use of computing resources that are delivered as a service over a network, such as the Internet. Typically, compute, storage, and network resources are offered in a cloud infrastructure, effectively shifting the workload from a local network to the cloud network.

Figure 2:
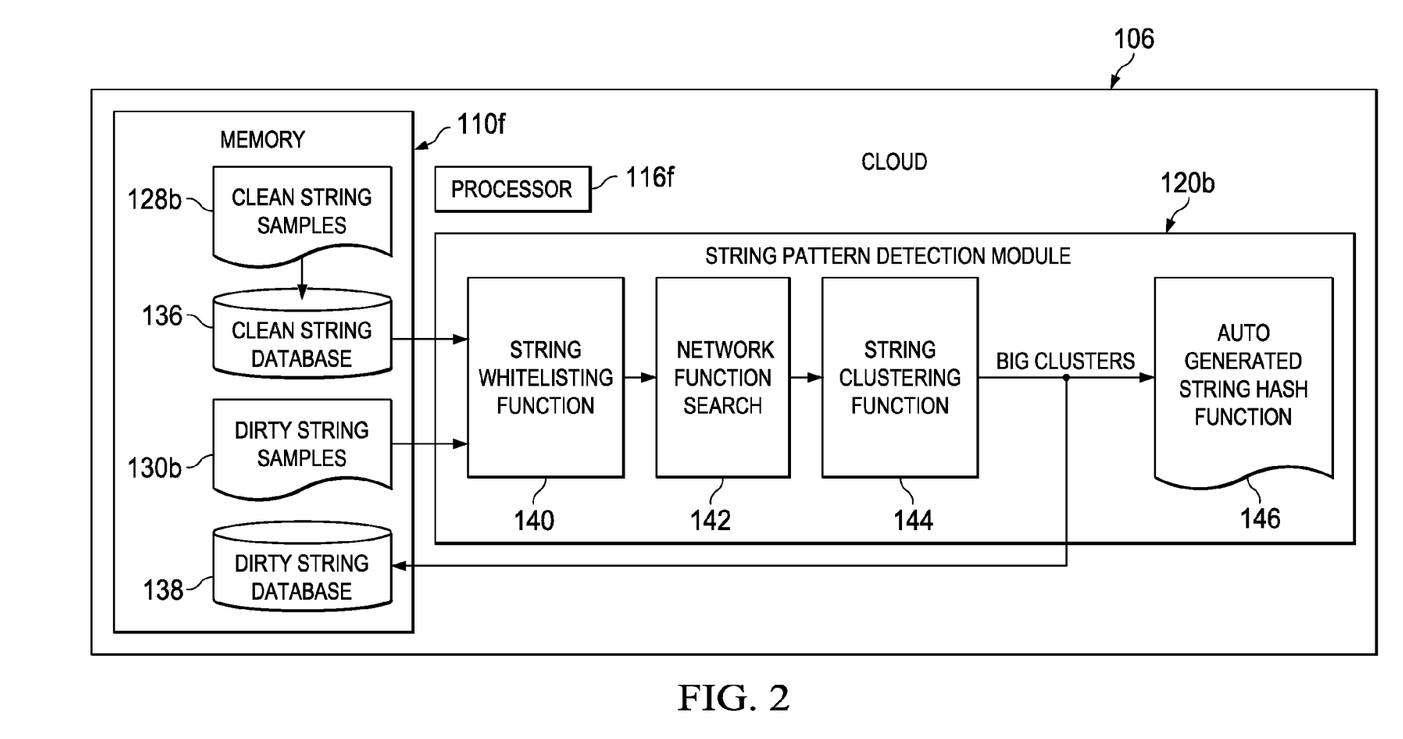
FIG. 2 is a simplified block diagram of a portion of a communication system for the discovery of malicious strings in accordance with an embodiment of the present disclosure.

Turning to FIG. 2, FIG. 2 is a simplified block diagram of a portion of a communication system 100 for the discovery of malicious strings in accordance with an embodiment of the present disclosure. FIG. 2 illustrates an example operation of string pattern detection module 120b in cloud 106. The example operation can equally apply to an example operation of string pattern detection module 120a in server 104. Samples of dirty strings, or potentially dirty strings, can be stored in dirty string samples 130b. The samples of dirty strings can be acquired from known malware applications that have been processed into string samples or from new applications or unknown applications that have been processed into string samples. The samples of dirty strings can be filtered with known clean string samples using a string whitelisting function 140. The known clean samples can be based on known samples of clean strings in clean string samples 128b. The samples of clean strings can be stored in clean string database 136. Filtering the dirty strings, or potentially dirty strings, with known clean strings can eliminate false positives of dirty strings related to malware. To further reduce the instances of false positives, a dirty string, or potentially dirty string, can be subjected to a network or Internet search using a network function search function 142. If the network or Internet search produces a number of hits comparable to clean string searches, then the potential dirty string may be a false positive as the string is commonly known. If the network or Internet search does not produce a comparable number of hits to clean string searches, then it is likely that the dirty string, or potentially dirty string, is related to malware. For example, an Internet search for the string sample may be performed and the results of the Internet search for the string sample can be compared with results of an Internet search for known clean string samples. In another example, a certain predetermined number of hits may be required before the string is not considered malware. The dirty strings, or potentially dirty strings, that are not found in clean string database 136 and do not produce a comparable number of hits to clean string searches can be clustered together using string clustering function 144.

String clustering function 144 can take the biggest clusters, or the group of dirty strings that are most commonly found, and communicate those strings to an auto generated signatures of string hashes function 146 where a hash of the dirty string can be created. The hashes created by auto generated signatures of string hashes function 146 can be stored in blacklist hash string database 114. String clustering function 144 can also take the biggest clusters, which contain string patterns common among a large number of distinctive malware samples, and communicate them to dirty string database 138. Small clusters can be the result of noise and could generate false positives during malware detection. Dirty string database 138 can be used by server 104 or cloud 106 to perform a more intensive search for malware on suspected applications or data sets. For example, suspected applications or data sets can be communicated to cloud 106 by electronic devices 102a-102d for a more intensive inspection and analysis than can be performed by electronic devices 102a-102d.

Figure 3:
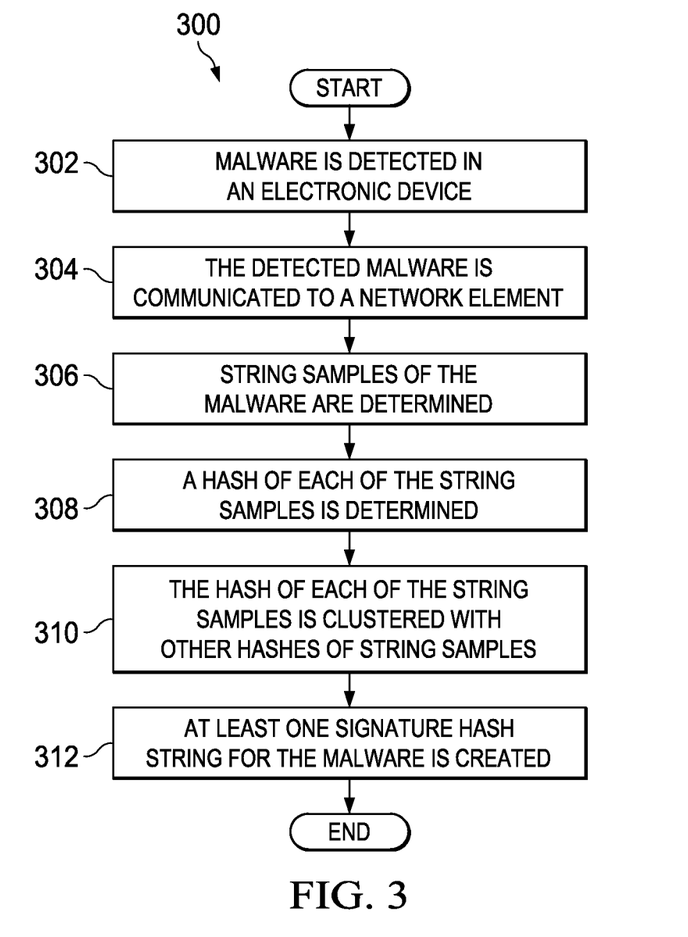
FIG. 3 is a simplified flowchart illustrating potential operations that may be associated with the communication system in accordance with an embodiment.

Turning to FIG. 3, FIG. 3 is an example flowchart illustrating possible operations of a flow 300 that may be associated with the creation of a hash for the discovery of malicious strings, in accordance with an embodiment. In an embodiment, one or more operations of flow 300 may be performed by malware detection modules 108a-108d and string pattern detection modules 102a and 120b. At 302, malware is detected in an electronic device. At 304, the detected malware is communicated to a network element. At 306, string samples of the malware are determined. At 308, a hash of each of the string samples is determined. At 310, the hash of each of the string samples is clustered with other hashes of string samples. At 312, a least one signature hash string for the malware is created.

Figure 4:
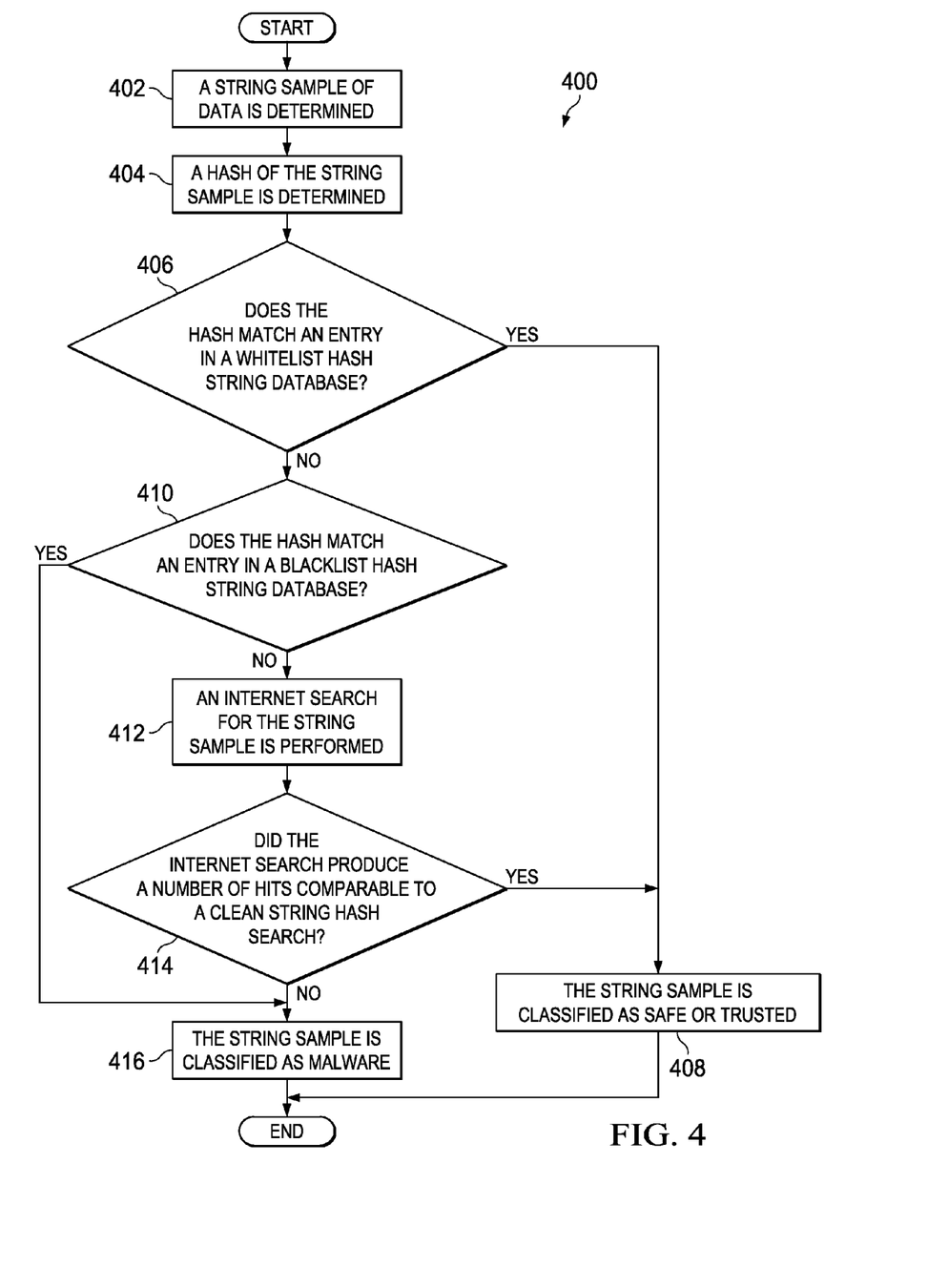
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with the discovery of malicious strings, in accordance with an embodiment. In an embodiment, one or more operations of flow 400 may be performed by malware detection modules 108a-108d and string pattern detection modules 120a and 120b. At 402, a string sample of data is determined. At 404, a hash of the string sample is determined. At 406, the system determines if the hash matches an entry in a whitelist hash string database. If the hash matches an entry in a whitelist hash string database, then the string sample is classified as clean or trusted, as in 408. If the hash does not match an entry in a whitelist hash string database, then the system determines if the hash matches an entry in a blacklist hash string database, as in 410. If the hash matches an entry in a blacklist hash string database, then string sample is classified as malware, as in 416. If the hash does not match an entry in a blacklist hash string database, then an Internet search for the string sample is performed, as in 412.

At 414, the system determines if the Internet search for the hash produced a number of hits comparable to a clean string hash search. If the Internet search for the hash produced a number of hits comparable to a clean string hash search, then the string sample is classified as safe or trusted, as in 408. If the Internet search for the hash did not produced a number of hits comparable to a clean string hash search, then the string sample is classified as malware, as in 416. In embodiment, if a string did not produced a number of hits comparable to a clean string, the string can be grouped with other strings that are unknown (i.e., the hash of the string did not match an entry in the whitelist or blacklist and an Internet search did not result in a relatively large amount of hits so therefore the string is unknown). Relatively large clusters of unknown samples can help prioritize and provide samples for malware researchers and in detecting new and unknown clean string samples and dirty string samples.

Figure 5:
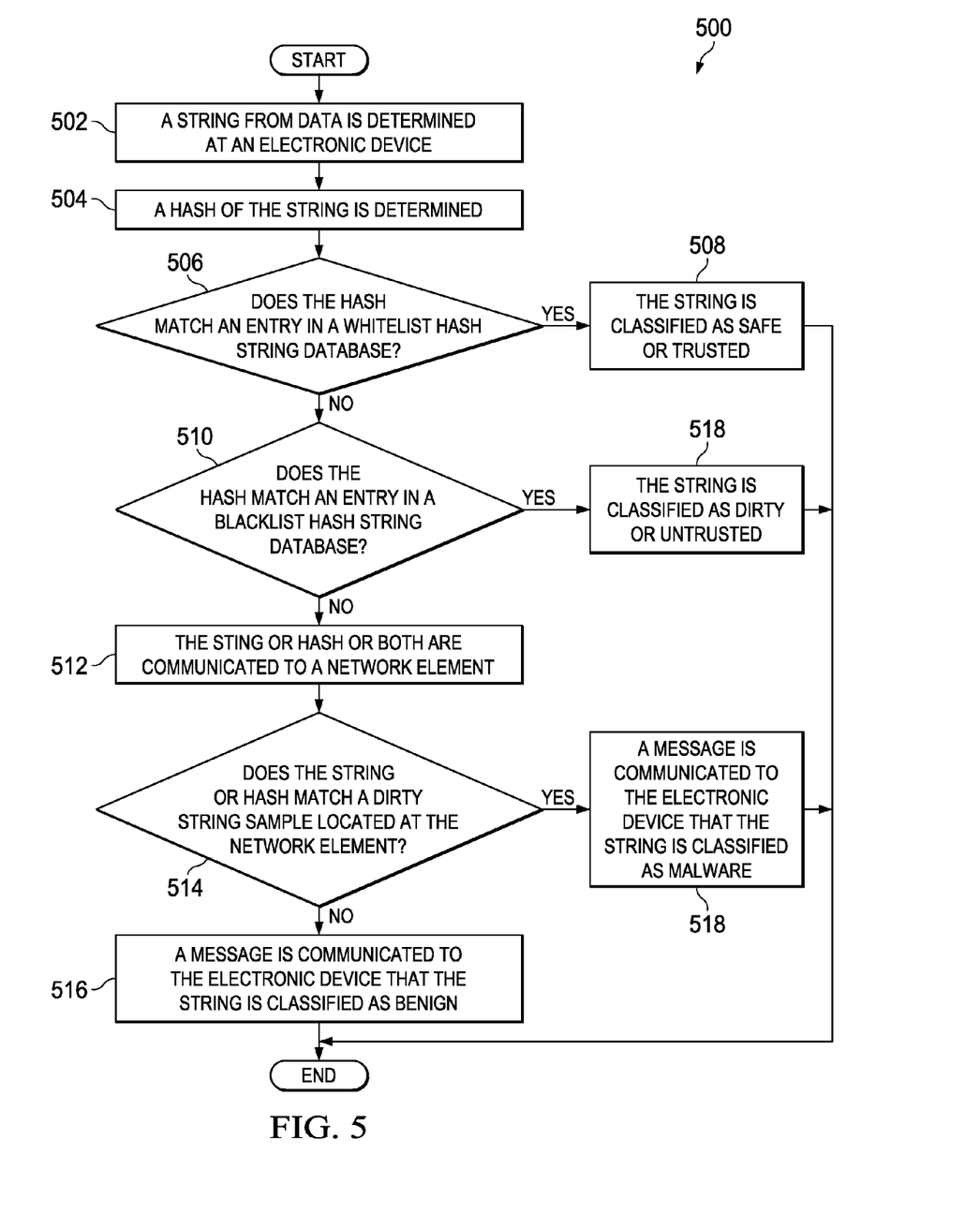
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with the discovery of malicious strings, in accordance with an embodiment. In an embodiment, one or more operations of flow 500 may be performed by malware detection modules 108a-108d and string pattern detection modules 120a and 120b. At 502, a string from data is determined at an electronic device. In an embodiment, a plurality of strings from an application or data are determined. At 504, a hash of the string is determined or created. In an embodiment, a hash is determined or created for each of the plurality of strings. In another embodiment, hashes from a plurality of strings are grouped together and hashes from the longest strings are determined or created.

At 506, the system determines if the hash matches an entry in a whitelist has string database. If the hash does match an entry in a whitelist hash string database, then the string is classified as safe or trusted, as in 508. If the hash does not match an entry in the whitelist hash string database, then the system determines if the hash matches an entry in a blacklist hash string database, as in 510. If the hash does match an entry in a blacklist hash string database, then the string is classified as dirty or untrusted, as in 518. If the hash does not match an entry in a blacklist hash string database, then the string or hash or both are communicated to a network element, as in 512. For example, the string or hash or both may be communicated to server 104 or cloud 106.

At 514, the system determines if the string or hash match a dirty string sample located at the network element. For example, server 104 or cloud 106 may compare the string to entries in dirty string samples 130a or 130b respectively. Or, server 104 or cloud 106 may compare the hash to blacklist hash string database 114. If the string or hash does match a dirty string sample located at the network element, then a message is communicated to the electronic device that the string is classified as malware, as in 518. If the string or hash does not match a dirty string sample located at the network element, then a message is communicated to the electronic device that the string is classified as benign, as in 516.

Figure 6:
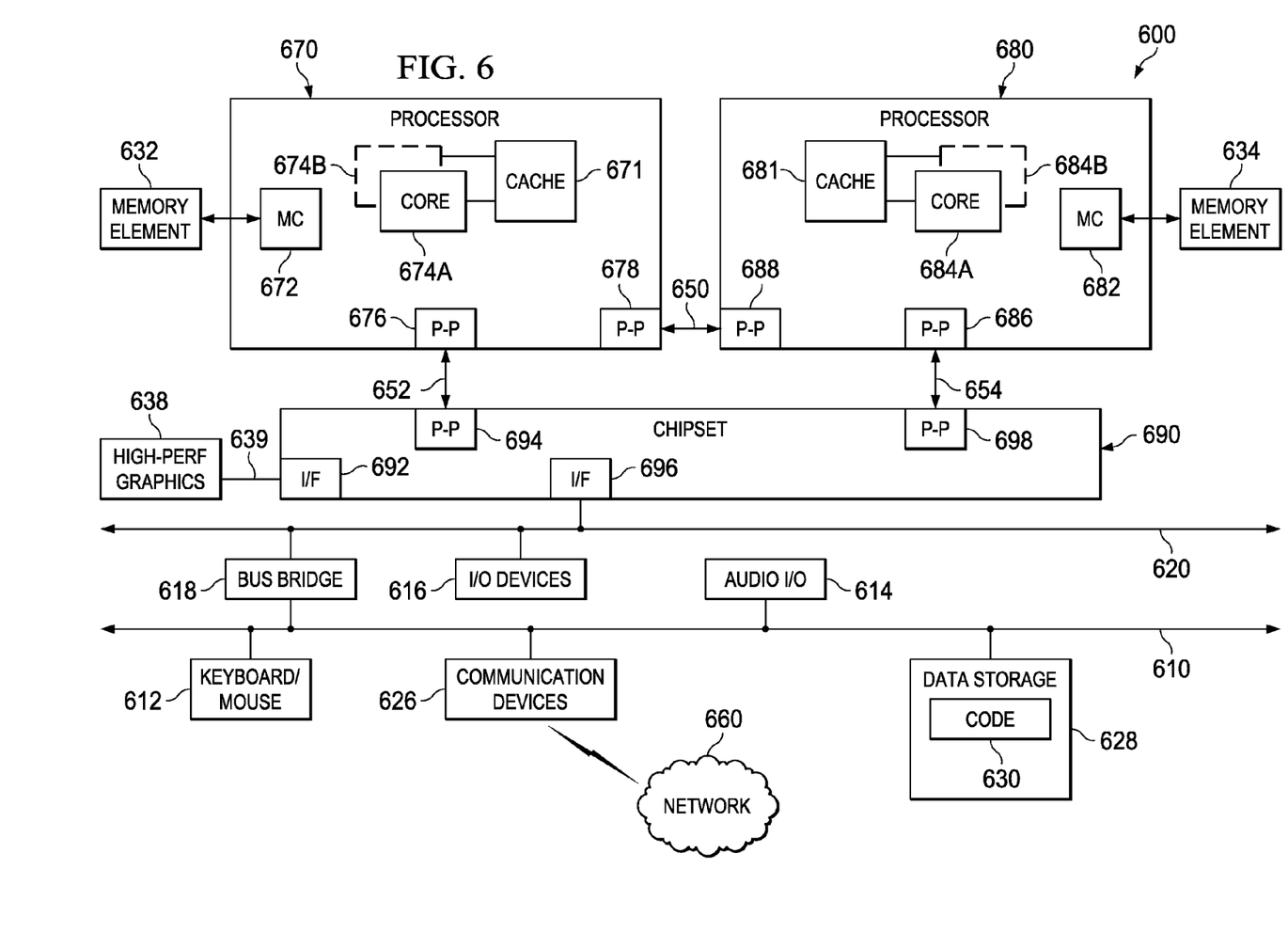
FIG. 6 is a block diagram illustrating an example computing system that is arranged in a point-to-point configuration in accordance with an embodiment.

Turning to FIG. 6, FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces. Generally, one or more of the network elements of communication system 100 may be configured in the same or similar manner as computing system 600.

As illustrated in FIG. 6, system 600 may include several processors, of which only two, processors 670 and 680, are shown for clarity. While two processors 670 and 680 are shown, it is to be understood that an embodiment of system 600 may also include only one such processor. Processors 670 and 680 may each include a set of cores (i.e., processor cores 674A and 674B and processor cores 684A and 684B) to execute multiple threads of a program. The cores may be configured to execute instruction code in a manner similar to that discussed above with reference to FIGS. 1-5. Each processor 670, 680 may include at least one shared cache 671, 681. Shared caches 671, 681 may store data (e.g., instructions) that are utilized by one or more components of processors 670, 680, such as processor cores 674 and 684.

Processors 670 and 680 may also each include integrated memory controller logic (MC) 672 and 682 to communicate with memory elements 632 and 634. Memory elements 632 and/or 634 may store various data used by processors 670 and 680. In alternative embodiments, memory controller logic 672 and 682 may be discreet logic separate from processors 670 and 680.

Processors 670 and 680 may be any type of processor and may exchange data via a point-to-point (PtP) interface 650 using point-to-point interface circuits 678 and 688, respectively. Processors 670 and 680 may each exchange data with a chipset 690 via individual point-to-point interfaces 652 and 654 using point-to-point interface circuits 676, 686, 694, and 698. Chipset 690 may also exchange data with a high-performance graphics circuit 638 via a high-performance graphics interface 639, using an interface circuit 692, which could be a PtP interface circuit. In alternative embodiments, any or all of the PtP links illustrated in FIG. 6 could be implemented as a multi-drop bus rather than a PtP link.

Chipset 690 may be in communication with a bus 620 via an interface circuit 696. Bus 620 may have one or more devices that communicate over it, such as a bus bridge 618 and I/O devices 616. Via a bus 610, bus bridge 618 may be in communication with other devices such as a keyboard/mouse 612 (or other input devices such as a touch screen, trackball, etc.), communication devices 626 (such as modems, network interface devices, or other types of communication devices that may communicate through a computer network 660), audio I/O devices 614, and/or a data storage device 628. Data storage device 628 may store code 630, which may be executed by processors 670 and/or 680. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 7:
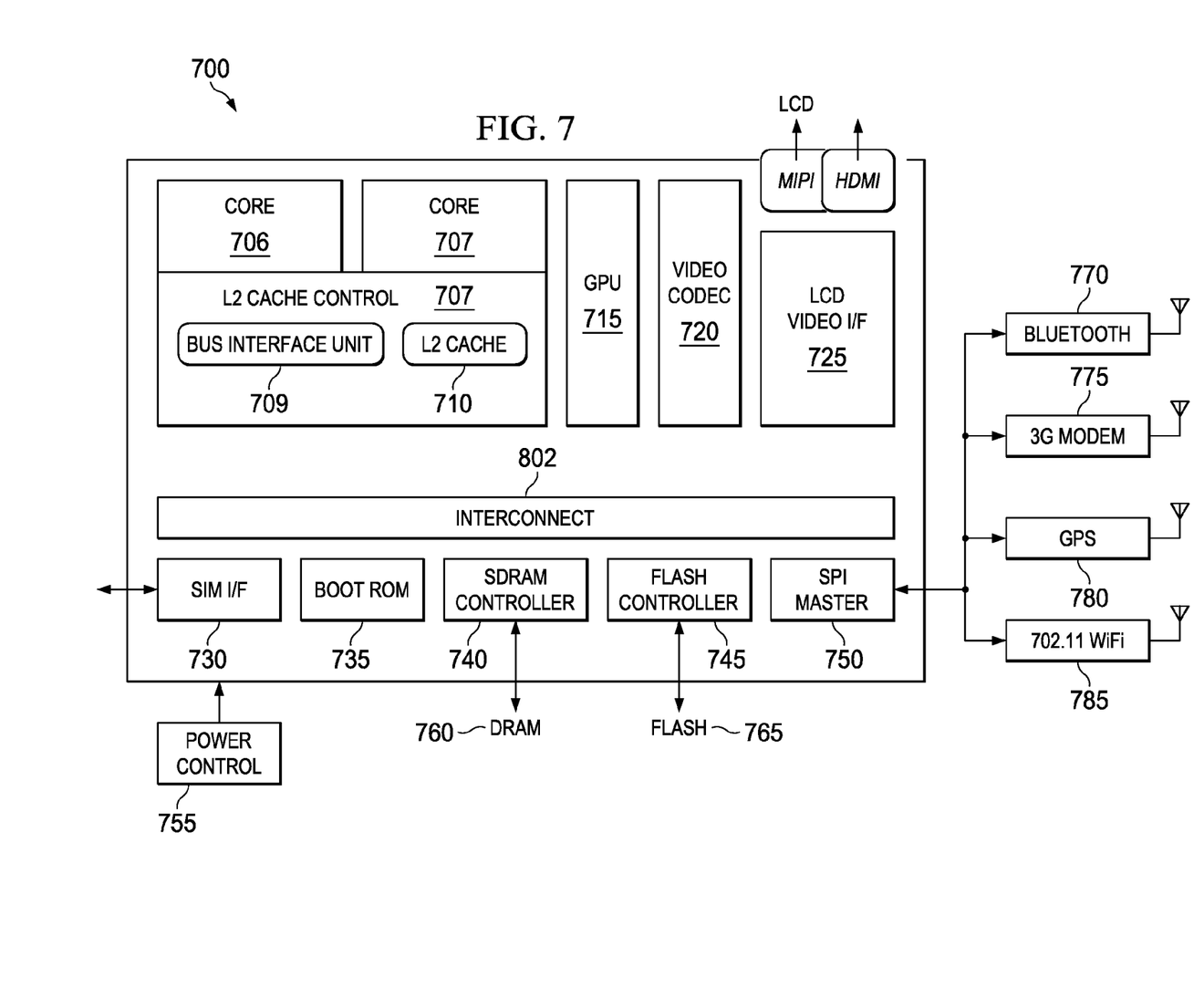
FIG. 7 is a simplified block diagram associated with an example ARM ecosystem system on chip (SOC) of the present disclosure.

Turning to FIG. 7, FIG. 7 is a simplified block diagram associated with an example ARM ecosystem SOC 700 of the present disclosure. At least one example implementation of the present disclosure can include the detection of malicious strings features discussed herein and an ARM component. For example, the example of FIG. 7 can be associated with any ARM core (e.g., A-7, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 7, ARM ecosystem SOC 700 may include multiple cores 706-707, an L2 cache control 708, a bus interface unit 709, an L2 cache 710, a graphics processing unit (GPU) 715, an interconnect 702, a video codec 720, and a liquid crystal display (LCD) I/F 725, which may be associated with mobile industry processor interface (MIPI)/high-definition multimedia interface (HDMI) links that couple to an LCD.

ARM ecosystem SOC 700 may also include a subscriber identity module (SIM) I/F 730, a boot read-only memory (ROM) 735, a synchronous dynamic random access memory (SDRAM) controller 740, a flash controller 745, a serial peripheral interface (SPI) master 750, a suitable power control 755, a dynamic RAM (DRAM) 760, and flash 765. In addition, one or more example embodiments include one or more communication capabilities, interfaces, and features such as instances of Bluetooth™ 770, a 3G modem 775, a global positioning system (GPS) 780, and an 802.11 Wi-Fi 785.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
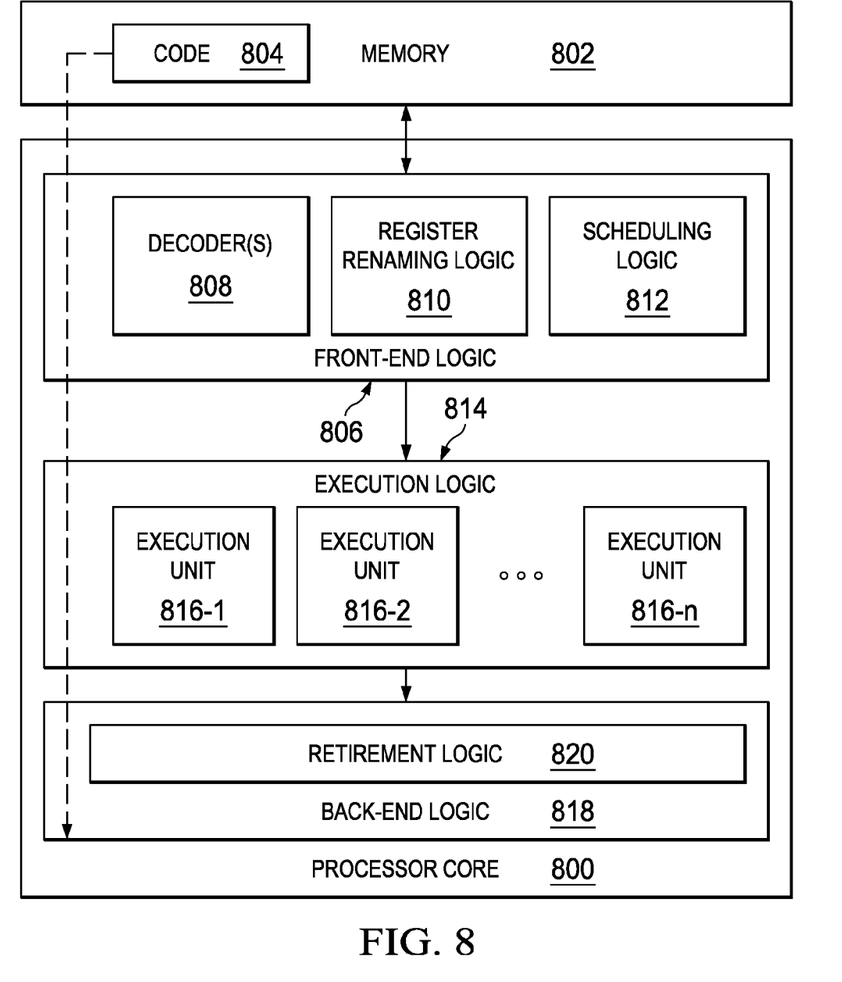
FIG. 8 is a block diagram illustrating an example processor core in accordance with an embodiment.

Turning to FIG. 8, FIG. 8 illustrates a processor core 800 according to an embodiment. Processor core 800 may be the core for any type of processor, such as a micro-processor, an embedded processor, a digital signal processor (DSP), a network processor, or other device to execute code. Although only one processor core 800 is illustrated in FIG. 8, a processor may alternatively include more than one of the processor core 800 illustrated in FIG. 8. For example, processor core 800 represents one example embodiment of processors cores 674a, 674b, 684a, and 684b shown and described with reference to processors 670 and 680 of FIG. 6. Processor core 800 may be a single-threaded core or, for at least one embodiment, processor core 800 may be multithreaded in that it may include more than one hardware thread context (or "logical processor") per core.

FIG. 8 also illustrates a memory 802 coupled to processor core 800 in accordance with an embodiment. Memory 802 may be any of a wide variety of memories (including various layers of memory hierarchy) as are known or otherwise available to those of skill in the art. Memory 802 may include code 804, which may be one or more instructions, to be executed by processor core 800. Processor core 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor core 800 can also include execution logic 814 having a set of execution units 816-1 through 816-N. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor core 800 allows out of order execution but requires in order retirement of instructions. Retirement logic 820 may take a variety of known forms (e.g., re-order buffers or the like). In this manner, processor core 800 is transformed during execution of code 804, at least in terms of the output generated by the decoder, hardware registers and tables utilized by register renaming logic 810, and any registers (not shown) modified by execution logic 814.

Although not illustrated in FIG. 8, a processor may include other elements on a chip with processor core 800, at least some of which were shown and described herein with reference to FIG. 6. For example, as shown in FIG. 6, a processor may include memory control logic along with processor core 800. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 3-5) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable storage medium having one or more instructions that when executed by at least one processor, cause the at least one processor to determine a string sample of data, determine a hash of the string sample of data, automatically cluster the hash with other hashes from other string samples of data, and automatically create a string hash signature of a string sample of data.

In Example C2, the subject matter of Example C1 can optionally include where the one or more instructions that when executed by the at least one processor, further cause the processor to filter the hash of the string sample of data using a clean string database and not cluster the hash of the string sample of data with the other hashes if the hash of the string sample of data is found in the clean string database.

In Example C3, the subject matter of any one of Examples C1-C2 can optionally include where the one or more instructions that when executed by the at least one processor, further cause the processor to perform an Internet search for the string sample, and compare the results of the Internet search for the string sample with results of an Internet search for known clean string samples and not cluster the hash of the string sample of data if the number of hits from the Internet search is comparable to the number of hits from a known clean string sample search.

In Example C4, the subject matter of any one of Examples C1-C3 can optionally include where the string of sample data was received from an electronic device.

In Example C5, the subject matter of any one of Examples C1-C4 can optionally include where the string of sample data is suspected malware.

In Example C6, the subject matter of any one of Example C1-C5 can optionally include where the string-hash signature is a signature that includes hashes of dirty strings and the string hash signature is communicated to an electronic device for use in the detection of the malware.

In Example C7, the subject matter of any one of Examples C1-C6 can optionally include where the one or more instructions that when executed by the at least one processor, further cause the processor to remove hashes of short strings from the cluster of hashes.

In Example C8, the subject matter of any one of Examples C1-C7 can optionally include where the one or more instructions that when executed by the at least one processor, further cause the processor to communicate the string hash signature to a dirty hash string database.

In Example A1, an electronic device can include a string pattern detection module, where the string pattern detection module is configured to determine a string sample of data, determine a hash of the string sample of data, automatically cluster the hash with other hashes from other string samples of data, and automatically create a string hash signature for the string sample of data.

In Example, A2, the subject matter of Example A1 can optionally include where the string pattern detection module is further configured to filter the hash of the string sample of data using a clean string database and not cluster the hash of the string sample of data with the other hashes if the hash of the string sample of data is found in the clean string database.

In Example A3, the subject matter of any one of Examples A1-A2 can optionally include where the string pattern detection module is further configured to perform an Internet search for the string sample, and compare the results of the Internet search for the string sample with results of an Internet search for known clean string samples and not cluster the hash of the string sample of data if the number of hits from the Internet search is comparable to the number of hits from a known clean string sample search.

In Example A4, the subject matter of any one of Examples A1-A3 can optionally include where the string of sample data was received from an electronic device.

In Example A5, the subject matter of any one of Examples A1-A4 can optionally include where the string of sample data is suspected malware.

In Example A6, the subject matter of any one of Examples A1-A5 can optionally include where the string hash signature is a signature that includes hashes of dirty strings and the string hash signature is communicated to an electronic device for use in the detection of the malware.

In Example A7, the subject matter of any one of Examples A1-A6 can optionally include where the string pattern detection module is further configured to remove hashes of short strings from the cluster of hashes.

In Example A8, the subject matter of any one of Examples A1-A7 can optionally include where the string pattern detection module is further configured to communicate the string hash signature to a dirty hash string database.

Example M1 is a method including determining a string sample of data, determining a hash of the string sample of data, automatically clustering the hash with other hashes from other string samples of data, and automatically creating a string hash signature for the string sample of data.

In Example M2, the subject matter of Example M1 can optionally include filtering the hash of the string sample of data using a clean string database and not cluster the hash of the string sample of data with the other hashes if the hash of the string sample of data is found in the clean string database.

In Example M3, the subject matter of any one of the Examples M1-M2 can optionally include performing an Internet search for the string sample, and comparing the results of the Internet search for the string sample with results of an Internet search for known clean string samples and not cluster the hash of the string sample of data if the number of hits from the Internet search is comparable to the number of hits from a known clean string sample search.

In Example M4, the subject matter of any one of the Examples M1-M3 can optionally include where the string of sample data was received from an electronic device.

In Example M5, the subject matter of any one of the Examples M1-M4 can optionally include where the string of sample data is suspected malware.

In Example M6, the subject matter of any one of the Examples M1-M5 can optionally include where the string-hash signature is a signature that includes hashes of dirty strings and the string hash signature is communicated to an electronic device for use in the detection of the malware.

In Example M7, the subject matter of any one of the Examples M1-M6 can optionally include removing hashes of short strings from the cluster of hashes.

Example S1 is a system for discovering malicious strings, the system including a string pattern detection module configured for determining a string sample of data, determining a hash of the string sample of data, automatically clustering the hash with other hashes from other string samples of data, and automatically creating a string hash signature for the string sample of data.

In Example S2, the subject matter of Example S1 can optionally include where the system is further configured for filtering the hash of the string sample of data using a clean string database and not cluster the hash of the string sample of data with the other hashes if the hash of the string sample of data is found in the clean string database and filtering the hash of the string sample of data using a dirty string database and not cluster the hash of the string sample of data with the other hashes if the hash of the string sample of data is found in the dirty string database.

Example X1 is a machine-readable storage medium including machine-readable instructions to implement a method or realize an apparatus as in any one of the Examples A1-A8, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory computer-readable medium comprising one or more instructions that when executed by at least one processor, cause the at least one processor to:
    populate strings extracted from clean samples into a clean string database;
    populate strings extracted from dirty samples into a dirty string database;
    determine a string sample of data;
    determine a hash of the string sample of data;
    perform an Internet search for the string sample;
    compare the results of the Internet search for the string sample with results of an Internet search for known clean string samples;
    not cluster the hash of the string sample of data if the number of hits from the Internet search is comparable to the number of hits from a known clean string sample search;
    cluster the hash with other hashes from other string samples of data to create a string hash signature of a string sample of data if the number of hits from the Internet search is not comparable to the number of hits from a known clean string sample search; and
    filter the hash of the string sample of data using the clean string database and not cluster the hash of the string sample of data with the other hashes if the hash of the string sample of data is found in the clean string database.

2. The at least one computer-readable medium of claim 1, wherein the string of sample data was received from an electronic device.

3. The at least one computer-readable medium of claim 2, wherein the string of sample data is suspected malware.

4. The at least one computer-readable medium of claim 1, wherein the string-hash signature is a signature that includes hashes of dirty strings and the string hash signature is communicated to an electronic device for use in the detection of the malware.

5. The at least one computer-readable medium of claim 1, further comprising one or more instructions that when executed by the at least one processor, further cause the processor to:
    remove hashes of short strings from the cluster of hashes; and
    communicate the string hash signature to the dirty hash string database.

6. The at least one computer-readable medium of claim 1, further comprising one or more instructions that when executed by the at least one processor, further cause the processor to:
- determine a cluster of most commonly occurring dirty strings in the dirty string database;
- create a hash of each of the dirty strings in the cluster of most commonly occurring dirty strings; and
- store the hash of each of the dirty strings from the cluster of most commonly occurring dirty strings in a blacklist hash string database.

7. An apparatus comprising:
memory; and
a hardware processor configured to:
- populate strings extracted from clean samples into a clean string database;
- populate strings extracted from dirty samples into a dirty string database;
- determine a string sample of data;
- determine a hash of the string sample of data;
- perform an Internet search for the string sample;
- compare the results of the Internet search for the string sample with results of an Internet search for known clean string samples;
- not cluster the hash of the string sample of data if the number of hits from the Internet search is comparable to the number of hits from a known clean string sample search;
- cluster the hash with other hashes from other string samples of data to create a string hash signature for the string sample of data if the number of hits from the Internet search is not comparable to the number of hits from a known clean string sample search; and
- filter the hash of the string sample of data using the clean string database and not cluster the hash of the string sample of data with the other hashes if the hash of the string sample of data is found in the clean string database.

8. The apparatus of claim 7, wherein the string of sample data was received from an electronic device.

9. The apparatus of claim 8, wherein the string of sample data is suspected malware.

10. The apparatus of claim 7, wherein the string hash signature is a signature that includes hashes of dirty strings and the string hash signature is communicated to an electronic device for use in the detection of the malware.

11. The apparatus of claim 7, wherein the hardware processor is further configured to:
- remove hashes of short strings from the cluster of hashes.

12. The apparatus of claim 7, wherein the hardware processor is further configured to:
- communicate the string hash signature to the dirty hash string database.

13. A method comprising:
- populating strings extracted from clean samples into a clean string database;
- populating strings extracted from dirty samples into a dirty string database;
- determining a string sample of data;
- determining a hash of the string sample of data;
- performing an Internet search for the string sample;
- comparing the results of the Internet search for the string sample with results of an Internet search for known clean string samples;
- not clustering the hash of the string sample of data if the number of hits from the Internet search is comparable to the number of hits from a known clean string sample search;
- clustering the hash with other hashes from other string samples of data to create a string hash signature for the string sample of data if the number of hits from the Internet search is not comparable to the number of hits from a known clean string sample search; and
- filtering the hash of the string sample of data using the clean string database and not clustering the hash of the string sample of data with the other hashes if the hash of the string sample of data is found in the clean string database.

14. The method of claim 13, wherein the string of sample data was received from an electronic device.

15. The method of claim 14, wherein the string of sample data is suspected malware.

16. The method of claim 13, wherein the string-hash signature is a signature that includes hashes of dirty strings and the string hash signature is communicated to an electronic device for use in the detection of the malware.

17. The method of claim 13, further comprising:
- removing hashes of short strings from the cluster of hashes.

18. A system for discovering malicious strings, the system comprising:
memory; and
a hardware processor configured for:
- populating strings extracted from clean samples into a clean string database;
- populating strings extracted from dirty samples into a dirty string database;
- determining a string sample of data;
- determining a hash of the string sample of data;
- performing an Internet search for the string sample;
- comparing the results of the Internet search for the string sample with results of an Internet search for known clean string samples;
- not clustering the hash of the string sample of data if the number of hits from the Internet search is comparable to the number of hits from a known clean string sample search;
- clustering the hash with other hashes from other string samples of data to create a string hash signature for the string sample of data if the number of hits from the Internet search is not comparable to the number of hits from a known clean string sample search; and
- filtering the hash of the string sample of data using the clean string database and not clustering the hash of the string sample of data with the other hashes if the hash of the string sample of data is found in the clean string database.

19. The system of claim 18, wherein the system is further configured for:
- filtering the hash of the string sample of data using the dirty string database and not clustering the hash of the string sample of data with the other hashes if the hash of the string sample of data is found in the dirty string database.

* * * * *